(12) United States Patent
Lim et al.

(10) Patent No.: US 12,092,890 B2
(45) Date of Patent: Sep. 17, 2024

(54) OPTICAL LENS AND OPTICAL DATA CAPTURING DEVICE

(71) Applicant: PixArt Imaging Inc., Hsin-Chu (TW)

(72) Inventors: Wan Piang Lim, Penang (MY); Sai Mun Lee, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/378,663

(22) Filed: Oct. 11, 2023

(65) Prior Publication Data

US 2024/0036286 A1    Feb. 1, 2024

Related U.S. Application Data

(63) Continuation of application No. 17/148,491, filed on Jan. 13, 2021, now Pat. No. 11,822,143.

(51) Int. Cl.
| | |
|---|---|
| *G02B 7/00* | (2021.01) |
| *G02B 3/06* | (2006.01) |
| *G02B 7/20* | (2021.01) |
| *G03B 17/12* | (2021.01) |

(52) U.S. Cl.
CPC .............. *G02B 7/003* (2013.01); *G02B 3/06* (2013.01); *G02B 7/20* (2013.01); *G03B 17/12* (2013.01)

(58) Field of Classification Search
None
See application file for complete search history.

(56) References Cited

U.S. PATENT DOCUMENTS

| | | | |
|---|---|---|---|
| 2020/0049931 A1 | 2/2020 | Wei | |
| 2020/0057179 A1 | 2/2020 | Yang | |

FOREIGN PATENT DOCUMENTS

| | | | |
|---|---|---|---|
| CN | 201017088 Y | | 2/2008 |
| CN | 101183166 A | | 5/2008 |
| CN | 101354448 A | | 1/2009 |
| CN | 101520521 A | | 9/2009 |
| CN | 108590997 A | | 9/2018 |
| CN | 208432777 U | | 1/2019 |
| CN | 209590376 U | | 11/2019 |
| JP | 2005-84328 A | | 3/2005 |
| JP | 2005084328 A | * | 3/2005 |
| KR | 10-2016-0000179 A | | 1/2016 |
| KR | 10-2019-0005571 A | | 1/2019 |
| KR | 10-2019-0125096 A | | 11/2019 |
| TW | I670515 B | | 9/2019 |

OTHER PUBLICATIONS

Reuqest for Examination submitted on Sep. 8, 2006 for the JP Application No. 2003-315667, filing date Sep. 8, 2003.

* cited by examiner

*Primary Examiner* — Robert E. Tallman
(74) *Attorney, Agent, or Firm* — Winston Hsu

(57) ABSTRACT

An optical lens, comprising: a first part, comprising a first surface; and a second part, comprising a second surface, a third surface and at least one concave portion. The first surface and the second surface are not parallel with the third surface, the first part protrudes from the third surface, and the first surface and the second surface are connected with the third surface.

18 Claims, 6 Drawing Sheets

OPTICAL LENS AND OPTICAL DATA CAPTURING DEVICE

CROSS REFERENCE TO RELATED APPLICATIONS

This application is a continuation application of U.S. application Ser. No. 17/148,491, filed on Jan. 13, 2021. The content of the application is incorporated herein by reference.

BACKGROUND OF THE INVENTION

1. Field of the Invention

The present invention relates to an optical lens and an optical data capturing device, and particularly relates to an optical lens which can be attached to a barrel or an optical sensor without connection devices and adhesive material, and an optical data capturing device using the optical lens.

2. Description of the Prior Art

In prior art, connection components such as screws or adhesive material are needed while attaching an optical lens to a barrel or an optical sensor. Such method increases the difficulty and cost while assembling an optical data capturing device comprising the optical lens.

SUMMARY OF THE INVENTION

One objective of the present invention is to provide an optical lens, which can be assembled with other components without connection components and adhesive material.

Another objective of the present invention is to provide an optical data capturing device comprising an optical lens, which can be assembled with other components without connection components and adhesive material.

One embodiment of the present application discloses an optical lens, comprising: a first part, comprising a first surface; and a second part, comprising a second surface, a third surface and at least one concave portion. The first surface and the second surface are not parallel with the third surface, the first part protrudes from the third surface, and the first surface and the second surface are connected with the third surface.

Another embodiment of the present application discloses an optical data capturing device comprising an optical lens, a base, and an aperture component. The optical lens comprises: a first part, comprising a first surface; and a second part, comprising a second surface, a third surface and at least one concave portion. The first surface and the second surface are not parallel with the third surface, the first part protrudes from the third surface, the first surface and the second surface are connected with the third surface. The base comprises at least one protruding portion configured to assemble with the concave portion. The aperture component is provided in the base and configured to cover the optical lens.

In view of above-mentioned embodiments, the optical lens can be attached to a barrel (an aperture component) or an optical sensor without connection components or adhesive material. Therefore, the process of manufacturing the optical data capturing device can be simplified and related cost can be reduced.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Besides, the term "first", "second", "third" in following descriptions are only for the purpose of distinguishing different components, and do not mean the sequence of the elements. For example, a first device and a second device only mean these devices can have the same structure but are different devices.

Figure 1:
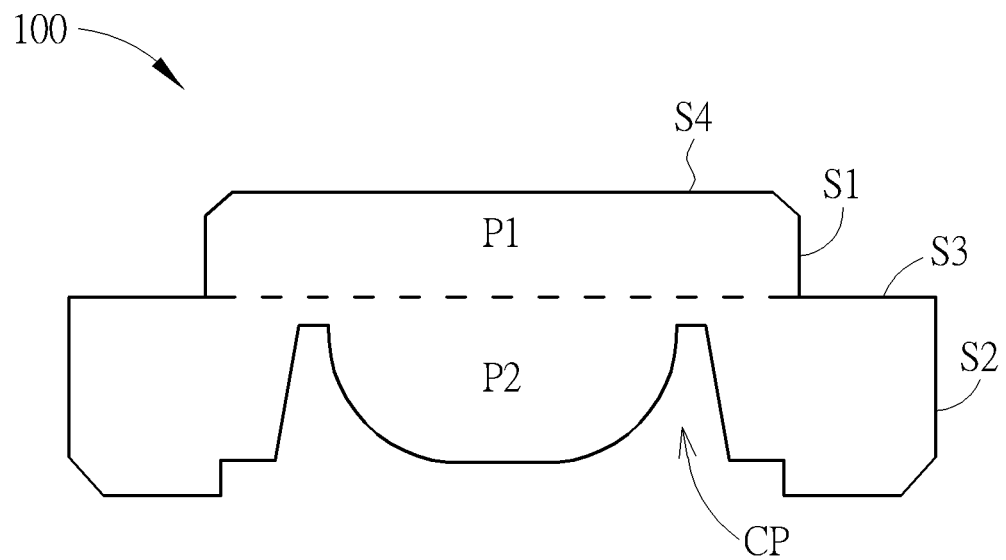
FIG. 1 is a schematic diagram illustrating an optical lens according to one embodiment of the present invention.
Figure 2:
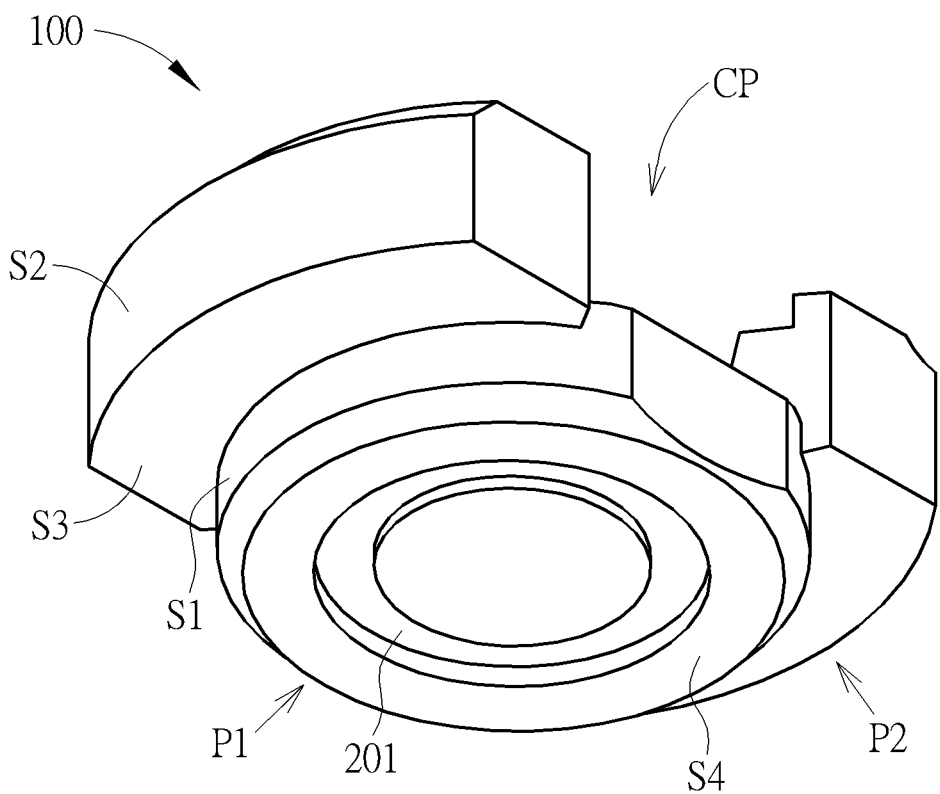
FIG. 2 is a schematic diagram illustrating the optical lens, which is shown in FIG. 1, viewed in another direction according to another embodiment of the present invention.

FIG. 1 is a schematic diagram illustrating an optical lens 100 according to one embodiment of the present invention. FIG. 2 is a schematic diagram illustrating the optical lens, which is shown in FIG. 1, viewed in another direction according to another embodiment of the present invention. Please also refer to FIG. 2 while referring to FIG. 1, to understand the present invention for more clarity.

As shown in FIG. 1 and FIG. 2, the optical lens 100 comprises a first part P1 and a second part P2. In one embodiment, the first part P1 and the second part P2 are formed in one piece. The first part P1 protrudes from the second part P2 and comprises a first surface S1. The first part P1 also comprises a fourth surface S4, which is configured to receive light when the optical lens 100 is assembled with an aperture component. In the embodiment of FIG. 1 and FIG. 2, the fourth surface S4 is opposite to the concave portion CP of the second part P2 and perpendicular with the first surface S1. However, any degrees of angle which is not 180° can exist between the first surface S1 and the fourth surface S4.

The second part P2 comprises a second surface S2 and at least one concave portion CP. Also, at least portion of the first surface S1 and at least portion of the second surface S2 are cylindrical. Additionally, the second part P2 further comprises a third surface S3, wherein the first surface S1 and the second surface S2 are not parallel with the third surface S3. That is, any degrees of angle which is not 180° can exist between the first surface S1 and the third surface S3, and any degrees of angle which is not 180° can exist between the second surface S2 and the third surface S3, depending on design requirements. In one embodiment, the first surface S1 and the second surface S2 are perpendicular with the third surface S3. Besides, please refer to FIG. 2, in one embodiment, the optical lens 100 can comprise a concave portion 201, which can be assembled with another component.

In one embodiment, the first surface S1 is configured to assemble with an aperture component, which may comprise a barrel. Also, in one embodiment, the first surface S1 is configured to assemble with an optical sensor or an electronic device. Furthermore, in the embodiments of FIG. 1 and FIG. 2, a dimension of the second part P2 is larger than the first part P1. However, a dimension of the second part P2 can be smaller than the first part P1.

Figure 3:
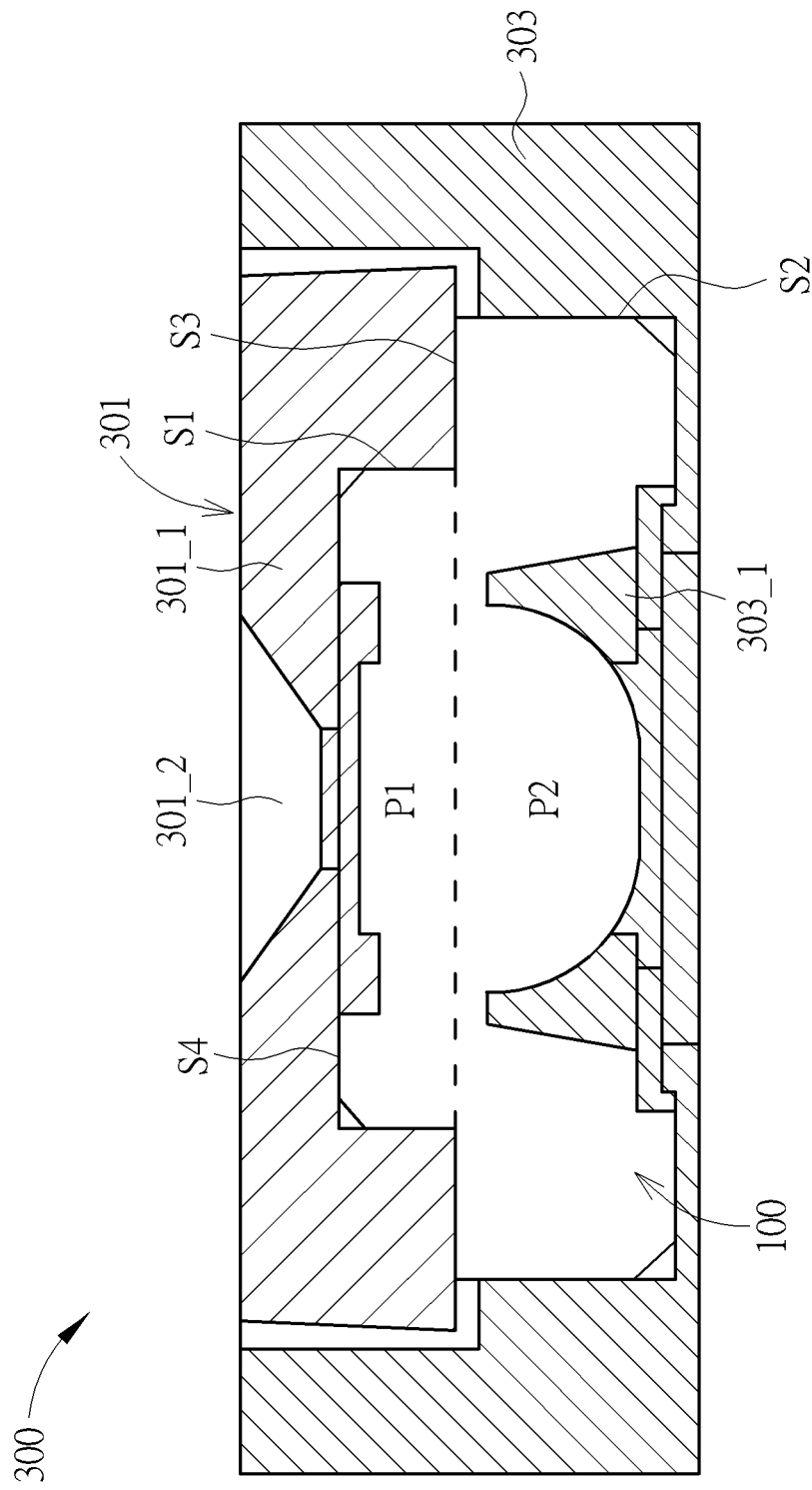
FIG. 3 is a schematic diagram illustrating an optical data capturing device, according to one embodiment of the present invention.

FIG. 3 is a schematic diagram illustrating an optical data capturing device 300, according to one embodiment of the present invention. The optical data capturing device 300 comprise the optical lens 100 illustrated in FIG. 1 and FIG. 2. However, please note, for the convenience of explaining, some numerals of the optical lens 100 are not shown in FIG. 3.

As shown in FIG. 3, besides the optical lens 100, the optical data capturing device 300 further comprises an aperture component 301 and a base 303. The aperture component 301, which comprises a barrel 301_1 and an aperture 301_2, is provided in the base 303 and configured to cover the optical lens 100. Besides, the base 303 comprises at least one protruding portion 303_1 configured to assemble with the concave portion CP. The base 303 can be a portion of an optical sensor or an electronic device. In one embodiment, the aperture component 301 can be assembled with the optical lens via the concave portion 201 illustrated in FIG. 2, but not limited.

As shown in FIG. 3, the first surface S1 of the first part P1 is configured to assemble with the aperture component 301, more specifically, to assemble with the barrel 301_1. Also, the second surface S2 is configured to assemble with the base 303. In the embodiment of FIG. 3, the aperture component 301 touches the first surface S1 and the third surface S3, but does not touch the second surface. The fourth surface S4 can receive light from the aperture 301_2.

As above-mentioned, at least portion of the first surface S1 and at least portion of the second surface S2 are cylindrical. By such structure, while assembling the optical lens 100 with the aperture component 301 and the base 303, the optical lens 100 can be firstly inserted into the based 303 and then slightly rotate the optical lens 100 if the optical lens 100 is not secured with the base 303. After that, the aperture component 301 can be provided on the optical lens 100, and then slightly rotate the aperture component 301 if the optical lens 100 is not secured with aperture component 301. By this way, the optical lens 100 can be secured with the aperture component 301 and the base 303 without connection components and adhesive material. Further, the tolerance of the dimension of the optical lens 100 can be increased since it can be secured with the aperture component 301 and the base 303 via the first surface S1 and the second surface S2.

Figure 4:
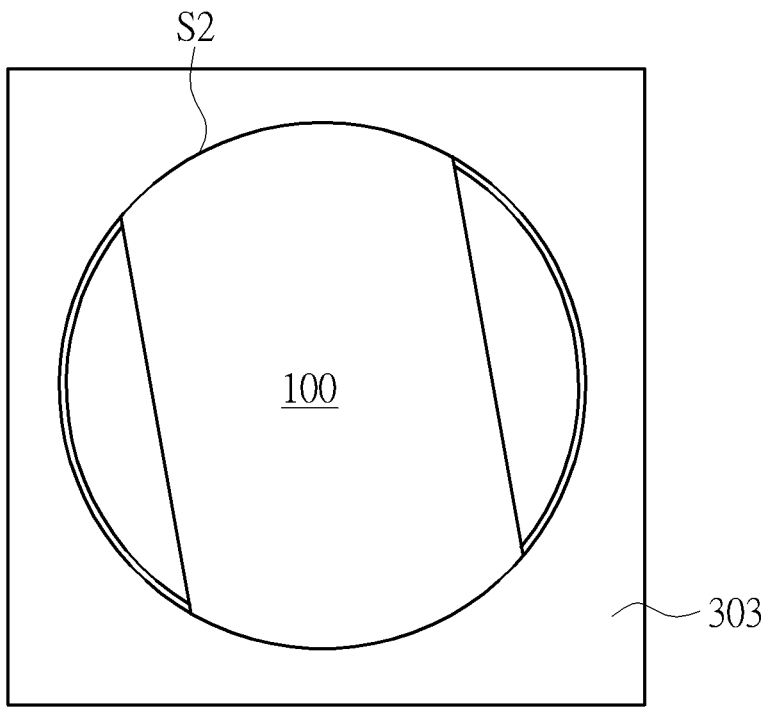
FIG. 4 is a top of the optical data capturing device illustrated in FIG. 3, according to one embodiment of the present invention.

FIG. 4 is a top view of the optical data capturing device 300 illustrated in FIG. 3, according to one embodiment of the present invention. In such embodiment, the aperture component 301 is not shown. FIG. 4 clearly illustrates that the optical lens 100 is inside the base 303 and is assembled with the base 303 via the second surface S2.

Figure 5:
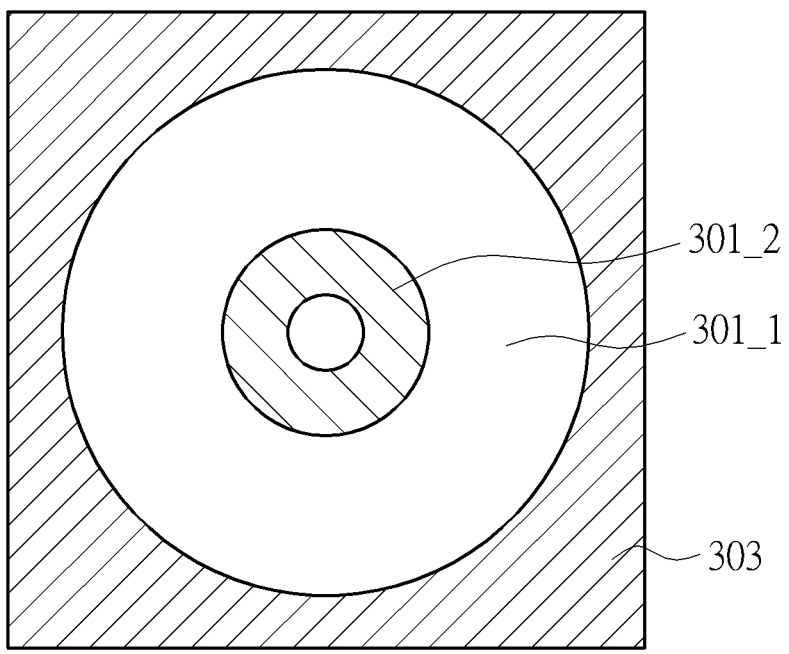
FIG. 5 is a top view of the optical data capturing device illustrated in FIG. 3, according to another embodiment of the present invention.

FIG. 5 is a top view of the optical data capturing device illustrated in FIG. 3, according to another embodiment of the present invention. In such embodiment, the aperture component 301 is illustrated. FIG. 5 clearly illustrates that the aperture component 301 is provided in the body 303 and covers the optical lens 100. Light can pass through the aperture 301_2 and is received by the fourth surface S4 of the optical sensor 101.

Figure 6:
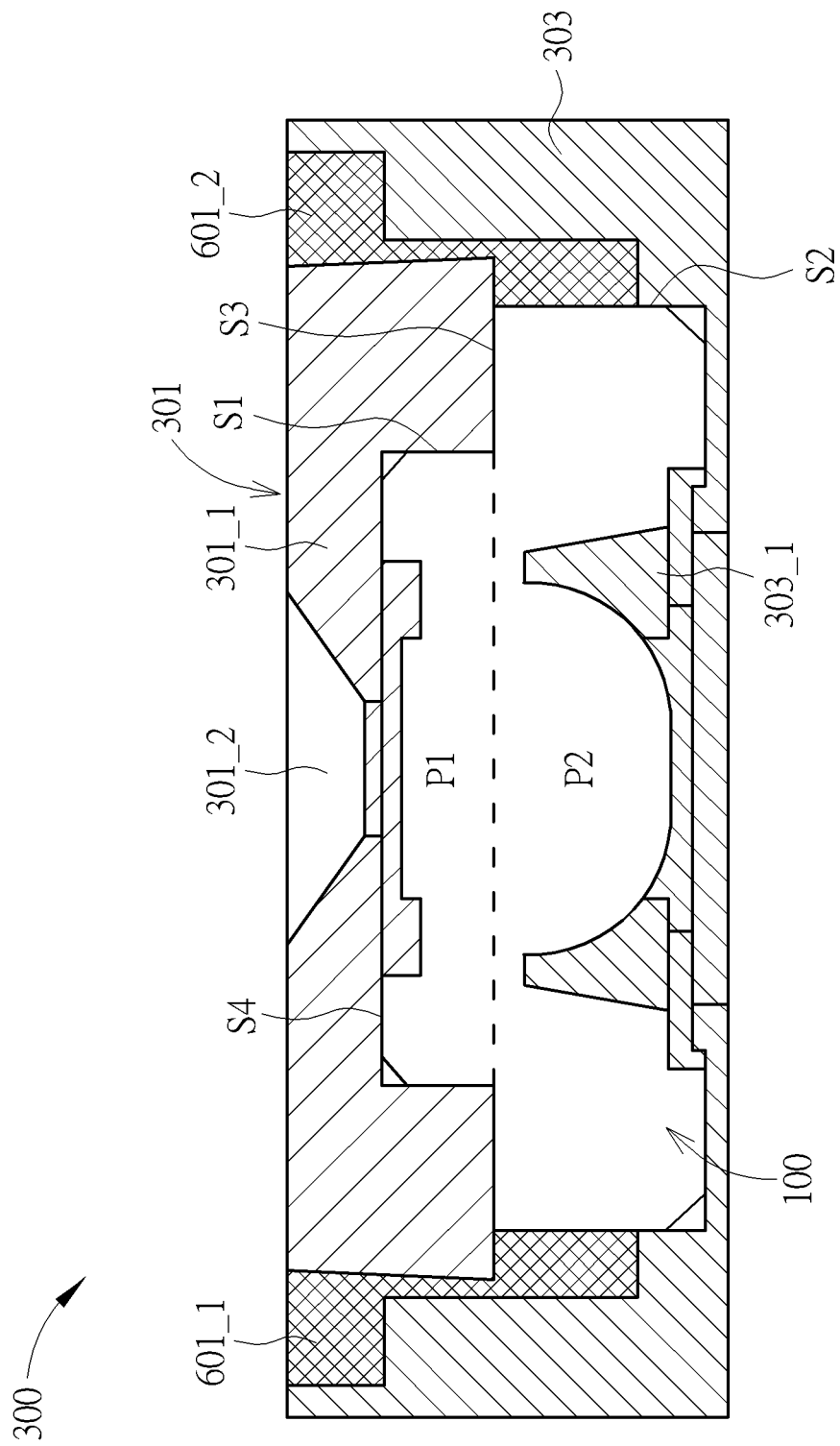
FIG. 6 is a schematic diagram illustrating an optical data capturing device, according to one embodiment of the present invention.

In one embodiment, adhesive material can further be used for strengthening the assembling of the optical lens 100 with the aperture component 301 and/or the base 303. FIG. 6 is a schematic diagram illustrating an optical data capturing device 600, according to one embodiment of the present invention. In this embodiment, besides the components illustrated in FIG. 3, the optical data capturing device 600 further comprises at least one slot 601_1, 601_2 located between the base 303 and the aperture component 301, and located between the base 303 and the second part P2. The slots 601_1, 601_2 comprise adhesive material provided therein, to strengthen the assembling of the optical lens 100 with the aperture component 301 and/or the base 303.

Figure 7:
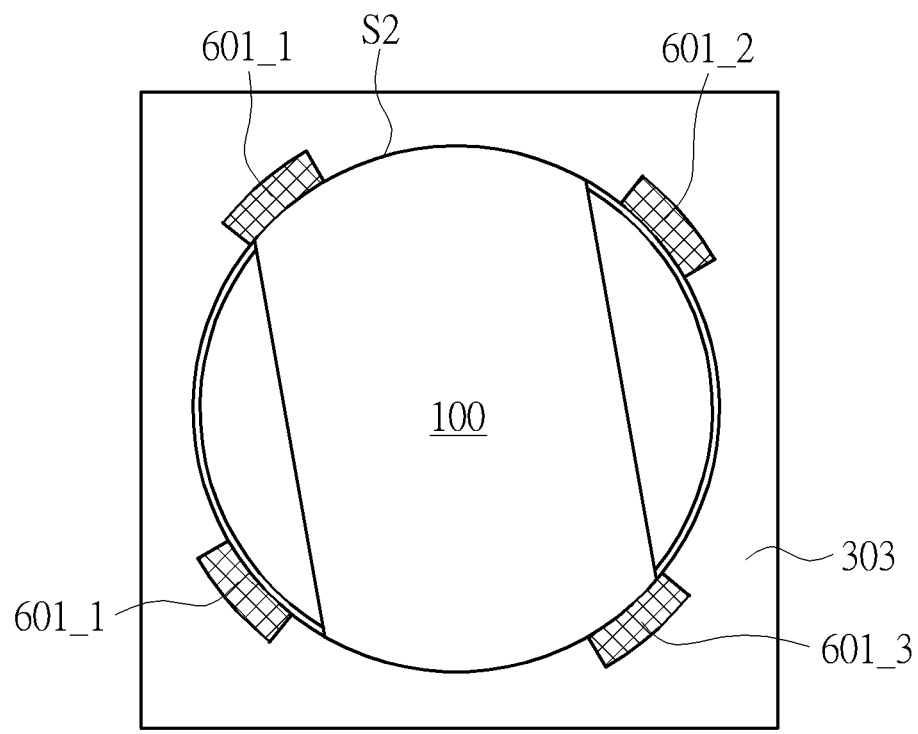
FIG. 7 is a top view of the optical data capturing device illustrated in FIG. 6, according to one embodiment of the present invention.
Figure 8:
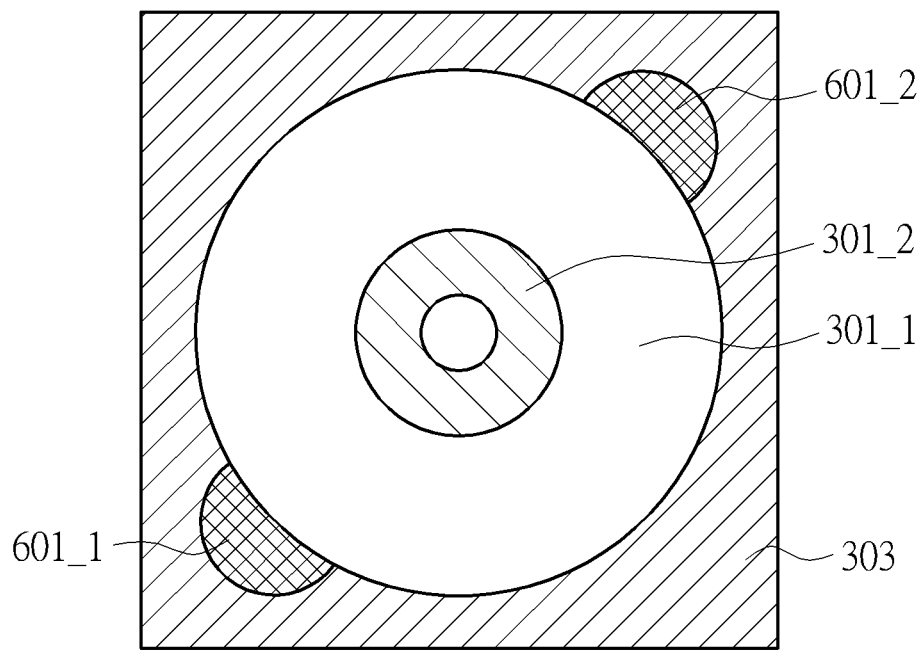
FIG. 8 is a top view of the optical data capturing device illustrated in FIG. 6, according to another embodiment of the present invention.

Please note, the number of the slots is not limited to be 2. FIG. 7 is a top view of the optical data capturing device illustrated in FIG. 6, according to one embodiment of the present invention. FIG. 7 is similar with FIG. 6, but further comprises slots 601_1, 601_2, 601_3 and 601_4. In the embodiment of FIG. 7, the number of the slots is 4 rather than 2. FIG. 8 is a top view of the optical data capturing device illustrated in FIG. 6, according to another embodiment of the present invention. FIG. 8 is similar with FIG. 6, but further comprises slots 601_1, 601_2. Since some structures in FIG. 6-FIG. 8 are the same as which in FIG. 3-FIG. 5, related descriptions are omitted for brevity here.

Figure 9:
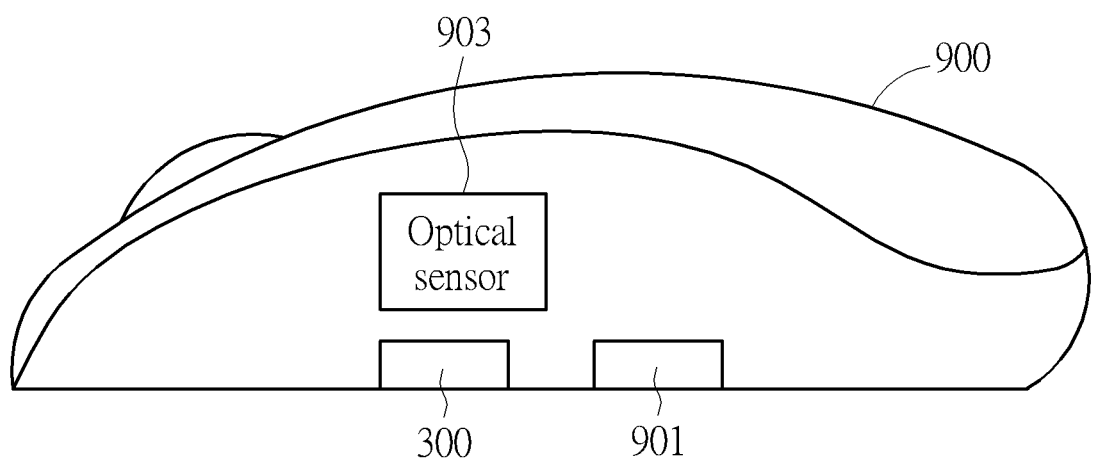
FIG. 9 is a schematic diagram illustrating an example of an optical mouse using the optical data capturing device provided by the present invention.

FIG. 9 is a schematic diagram illustrating an example of an optical mouse 900 using the optical data capturing device provided by the present invention. As illustrated in FIG. 9, the optical mouse 900 comprises a light source 901 and an optical sensor 903. The light source 901 is configured to emit light and the optical sensor 903 is configured to sense optical data (e.g., image) generated according to reflected light of the light emitted by the light source 901. The reflected light can pass thorough the aperture 301_2 of the optical data capturing device 300, to reach the optical sensor 903. Therefore, the base 303 of the optical data capturing device 300 in FIG. 3 can be portion of the optical sensor 903 or portion of the optical mouse 900. Besides the optical data capturing device 300, the optical data capturing device 600 illustrated in FIG. 6 can be applied to the optical mouse 900 as well.

It will be appreciated that the optical data capturing device provided by the present invention is not limited to be applied to an optical mouse or an optical navigation device. The optical data capturing device provided by the present invention can be provided to any electronic device which can sense optical data, such as a mobile phone with a camera.

In view of above-mentioned embodiments, the optical lens can be attached to a barrel (an aperture component) or an optical sensor without connection components or adhesive material. Therefore, the process of manufacturing the optical data capturing device can be simplified and related cost can be reduced.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An optical lens, comprising:
   a first part, comprising a first surface; and
   a second part, comprising a second surface, a third surface and at least one concave portion;
   wherein the first surface and the second surface are not parallel with the third surface, the first part protrudes from the third surface, the first surface and the second surface are connected with the third surface.

2. The optical lens of claim 1, wherein the first surface and the second surface are perpendicular with the third surface.

3. The optical lens of claim 1, wherein a dimension of the second part is larger than the first part.

4. The optical lens of claim 1, wherein a dimension of the second part is smaller than the first part.

5. The optical lens of claim 1, wherein the first part further comprises a fourth surface, opposite to the concave portion and configured to receive light.

6. The optical lens of claim 5, wherein the fourth surface is perpendicular with the first surface.

7. An optical data capturing device, comprising:
   an optical lens, comprising:
      a first part, comprising a first surface; and
      a second part, comprising a second surface, a third surface and at least one concave portion;
      wherein the first surface and the second surface are not parallel with the third surface, the first part protrudes from the third surface, the first surface and the second surface are connected with the third surface;
   a base, comprising at least one protruding portion configured to assemble with the concave portion; and
   an aperture component, provided in the base and configured to cover the optical lens.

8. The optical data capturing device of claim 7, wherein the aperture component touches the first surface and the third surface, but does not touch the second surface.

9. The optical data capturing device of claim 7, wherein the first surface and the second surface are perpendicular with the third surface.

10. The optical data capturing device of claim 7, wherein the first surface is configured to assemble with the aperture component.

11. The optical data capturing device of claim 7, wherein the first surface is configured to assemble with the base.

12. The optical data capturing device of claim 7, wherein the base is a portion of an optical sensor or an electronic device.

13. The optical data capturing device of claim 7, wherein a dimension of the second part is larger than the first part.

14. The optical data capturing device of claim 7, wherein a dimension of the second part is smaller than the first part.

15. The optical data capturing device of claim 7, wherein the first part and the second part are formed in one piece.

16. The optical data capturing device of claim 7, further comprising at least one slot located between the base and the aperture component, and located between the base and the second part, wherein the slot comprises adhesive material provided therein.

17. The optical data capturing device of claim 7, wherein the first part further comprises a fourth surface, opposite to the concave portion and configured to receive light.

18. The optical data capturing device of claim 17, wherein the fourth surface is perpendicular with the first surface.

* * * * *